June 24, 1969 — H. L. PHARES — 3,451,200
COTTON HARVESTER WITH FLOATING GATHERER
Filed Jan. 3, 1966 — Sheet 1 of 3

INVENTOR.
Howard L Phares
BY
Atty.

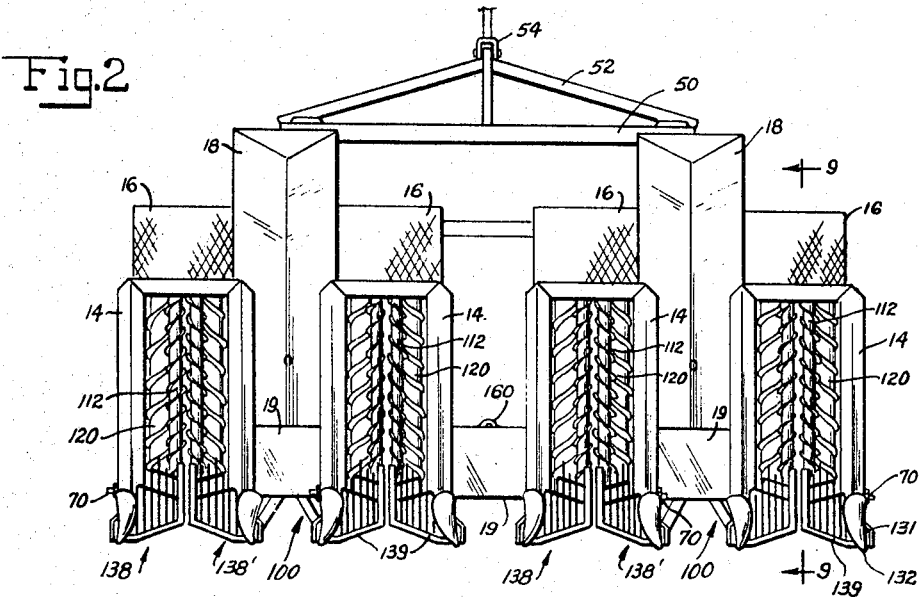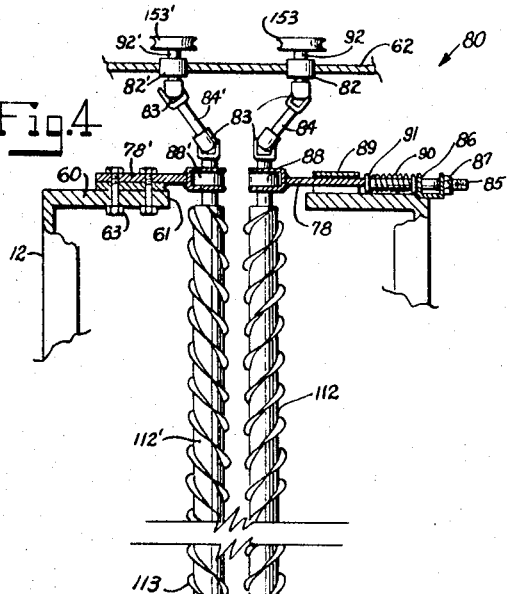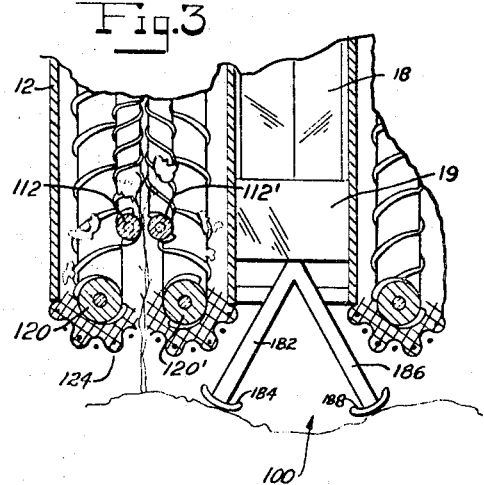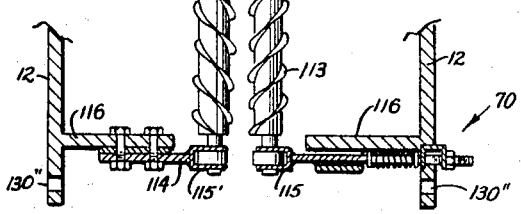

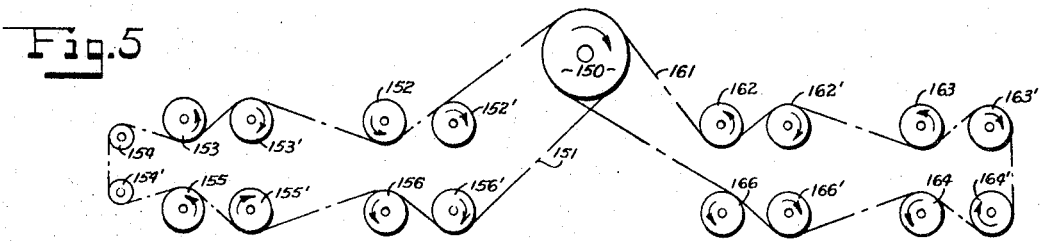
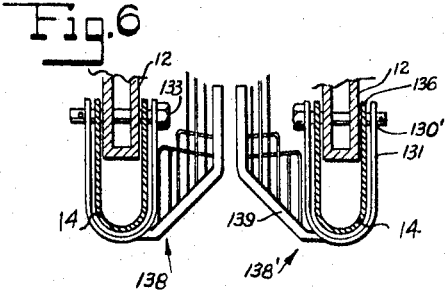
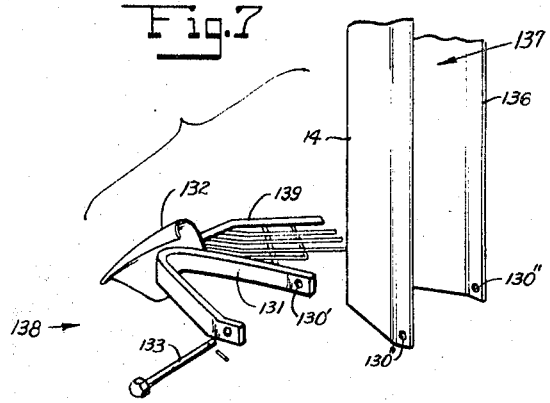
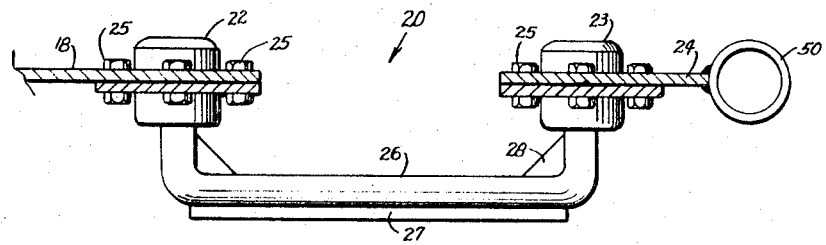
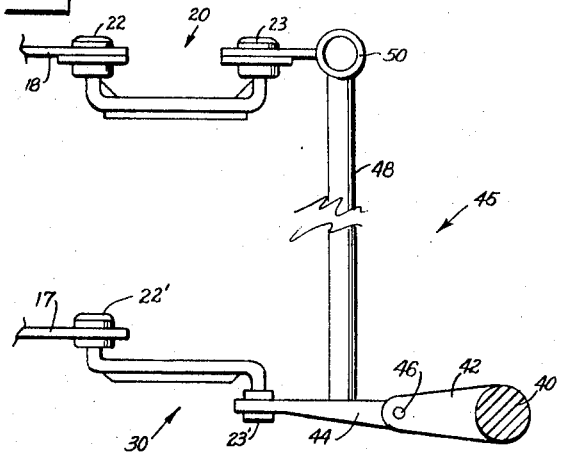

United States Patent Office 3,451,200
Patented June 24, 1969

3,451,200
COTTON HARVESTER WITH FLOATING GATHERER
Howard L. Phares, Lubbock, Tex., assignor to Phares & Wilkins Manufacturing Company, Lubbock, Tex., a copartnership
Filed Jan. 3, 1966, Ser. No. 518,242
Int. Cl. A01d 45/18
U.S. Cl. 56—33     7 Claims

ABSTRACT OF THE DISCLOSURE

A cotton stripper has the gathering unit mounted in front of the supporting vehicle. The back of the gathering unit is mounted to the front of the supporting vehicle by a parallel-motion linkage and is free to move or float laterally. Therefore, the gathering unit can stay on the row even though the propelling unit is not precisely aligned with the row of cotton to be harvested.

---

This invention relates to cotton harvesters and more particularly to a cotton harvester of the roller type which is mounted in a novel manner so as to enable the cotton gathering portion of the harvester to follow the cotton row aligned with the stalks of each row although the propelling portion of the harvester may not be exactly aligned with the rows. Mechanized cotton harvesters are known in the art. These devices of the prior art require great skill and attention on the part of the operator in order to keep the cotton gathering portion of the harvester properly aligned with the cotton stalks of each cotton row in a field of cotton. Small errors of alignment of the stripper with the rows of cotton amounting to only a few inches will misalign the stripper with the rows an excessive amount and cause unsatisfactory operation of the device.

In order to prevent this misalignment of a cotton harvester with the cotton stalks in a field of cotton, the present novel device provides for the stripper or gatherer portion of the machine to be arranged with respect to the rows of cotton so as to enable the stripper to freely move transverse to the rows of cotton and to the propelling portion of the harvester. A novel means that is related to the cotton field per se provides the necessary force for maintaining this proper alignment.

Normally, the portions of a cotton harvester that are mechanically associated with the field of cotton are the lifter and guide means that lifts the cotton and guides it into the mechanism that pulls the bolls therefrom; the gate which surrounds the cotton plants of each row of the cotton; and a stripping or gathering mechanism normally located within the stripper portion of the harvester that mechanically removes the fruit or cotton from the cotton plant or stalk. In the traditional field of irrigated cotton, the plants are arranged in parallel rows that form valleys and crests with the cotton being planted on the crest. The rows each have a furrow that may be used to provide a further means of alignment. Accordingly, the instant novel harvester takes advantage of all of these factors and circumstances so as to provide a harvester having a cotton gatherer or stripper that is sensitive to all of the foregoing elements so as to enable a harvester to have a stripper portion that follows cotton rows in suitable alignment even though the propelling device is not exactly aligned with the cotton puller or stripper or the cotton rows.

The many apparent advantages of such a device include reduced skill on the part of the operator; increased efficiency or higher yield of the cotton gathered from the field; faster harvesting and hence lowered gathering costs; increased quality of the gathered cotton; and ability to more suitably and efficiently operate the machine at night since alignment problems are tremendously reduced by the instant novel combinational harvester.

It is accordingly an object of this invention to provide a cotton harvesting machine of an improved type that includes a floating gathering or stripping machine that remains essentially aligned with the cotton rows while the propelling portion of the machine may simultaneously be misaligned with the rows of cotton.

Another object of this invention is to provide a novel means by which a stripping portion of a cotton harvester may be floatingly attached to a propelling vehicle.

A further object of this invention is to provide an improved spring loaded stripper roller that assists in maintaining the stripper aligned with the rows, and also improves the efficiency of the cotton stripper.

Still a further object of this invention is to provide a pivotal gate and lifter guide in conjunction with the stripping device of a cotton harvester.

Another additional object of this invention is the provision of skid guide means located with respect to the stripping machine so that the skid may engage the furrows formed on the side of a row of cotton to thereby additionally improve the alignment of the stripper machine where the additional alignment is deemed desirable.

Other objects of this invention will become apparent when the following description, including the drawings, are studied.

The subject matter which is regarded as my invention is particularly pointed out and distinctly claimed in the concluding portion of this specification. My invention itself, however, both as to its organization and method of operation, may best be understood by reference to the following description taken in conjunction with the accompanying drawings in which:

FIGURE 2 is a front view of the cotton harvester of FIGURE 1, showing only the stripper mechanism.

FIGURE 3 is a partial cross sectional view taken partially along the line 3—3 of FIGURE 1.

FIGURE 4 is a partial sectional view taken on the line 4—4 of FIGURE 1, some parts are not shown for clarity.

FIGURE 5 is schematical representation of the belt and pulley arrangement that powers the cotton stripping portion of the machine.

FIGURE 6 is a cross sectional view taken along lines 6—6 of FIGURE 1, some parts are not shown for clarity.

FIGURE 7 is an exploded view showing the relationship of some parts of FIGURE 6.

FIGURE 8 is a partial cross sectional view showing in detail a portion of the floating mechanism of FIGURE 1.

FIGURE 9 is an enlarged detail of the lifting platform as seen along line 9—9 of FIGURE 2.

Figure 1:
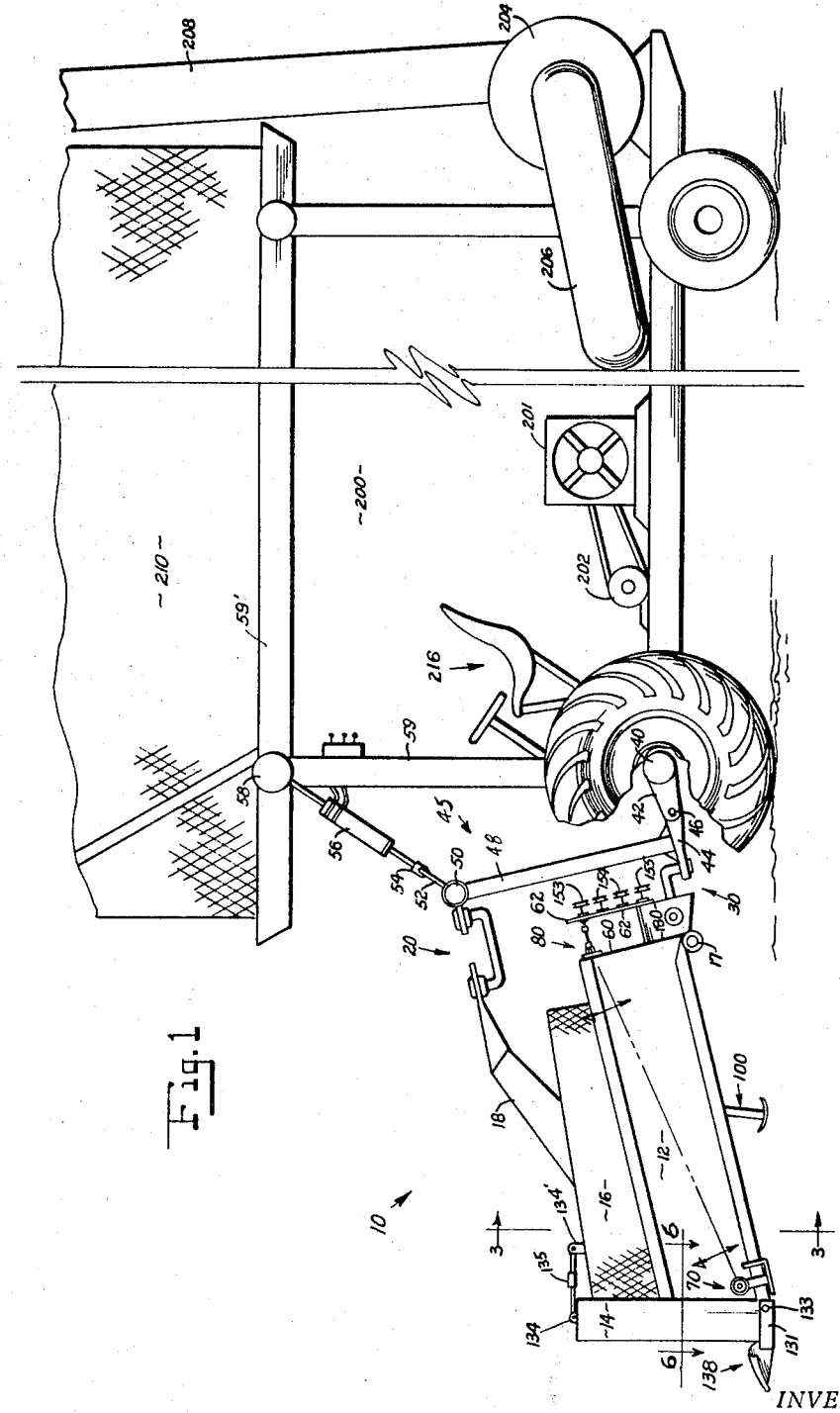
FIGURE 1 is side view of the cotton harvester according to one embodiment of this invention, with parts broken away in order to illustrate certain features therein.

Referring more specifically now to the drawings, it may be seen, particularly with reference to FIGURE 1, that the cotton harvester includes a power section or propelling unit 200 under control of an operator seated at 216 and having a stripping unit 10 operatively attached at the forward end of the power section 200. Operatively mounted on the propelling unit 200 is a motor 201 which provides power through a suitable drive mechanism including power take-off 202 to various portions of the harvesting machine. Mounted on top of the power section 200 is a supported hopper 210, which provides a receptacle for the harvested cotton.

The cotton stripper 10 is preferably comprised of four individual stripping or pulling units ganged together in a unitary manner to enable the stripping machine to harvest cotton simultaneously from four rows although it should be understood that any number of strippers may be so unitized. The four ganged stripping units are shown operatively fastened together in FIGURE 2. Each of the four unitized strippers is comprised of an enclosure 12 which houses and supports a set of roller strippers 112 and 112' operatively located above a set of screw conveyors 120 and 120' as best seen in FIGURE 3. Caged enclosure screen 16 is removably attached above enclosure 12 and prevents the cotton from escaping enclosure 12 as it is removed from the cotton stalk while at the same time providing a certain amount of cleaning since foreign matter may escape through the perforations therein. Forwardly located of the enclosure 12 and screen 16 is a gate 14 that is adapted to enclose the cotton plants as they enter the stripping machine so as to assist in guiding the cotton stalks into and between the roller strippers 112 and 112'. At the bottom extremity of the stripper is a lifting guide generally indicated by numeral 138 and including a frame 131 having a shoe 132 and fingers 139 integrally attached thereto. The shoe 132 rides on the soil and it with the other elements of frame 131 lift and guide the branches of the cotton plant to the inclined spiral roller strippers 112 and 112'. The lifter guide 138, which is comprised of the before mentioned shoe 132, finger guide means 139, and frame 131, are suitably fabricated into a unitary assembly and apertured at 130' so as to provide a lifting guide means that can run on the ground ahead of each leg of the gate.

The lifter guide and the floating gate are mutually attached to the frame of the stripper by a common pin 133 as best seen in FIGURES 6 and 7. The lifter guide and the floating gate are free to pivot about pin 133 independent of each other and with respect to the enclosure 12. Each stripper is provided with a lifter guide assembly located about a leg on either side of the floating gate 14 as best illustrated in FIGURES 2, 6 and 7.

The floating gate 14 is comprised of a bottomless boxlike structure having a contoured entrance portion at the forward end thereof that essentially forms an upstanding rectangle, and is fabricated at the other end so as to pivot in close tolerance relationship wtih respect to enclosure 12. The forward inlet end of the floating gate is comprised of a built-up boxed-in structure so as to form a monocoque self supporting rigid enclosure that is hollowed out as indicated by numeral 137 (FIGURE 7). The vertical rear edge of the gate is reinforced with a strip 136 of metal to distribute the load carried at the pivot point. The gate is apertured as a 130", for example, to mate with a like aligned aperture provided in the lower forward extremity of enclosure 12, and each aperture is aligned respective to each other in order to receive pivot pin 133. The top of the gate is provided with an ear 134 that cooperates with a turnbuckle 135 and a second ear 134' located on the cage 16 to provide an adjustable means when it is desired to fix the relative position of the gate with respect to the enclosure 12 (FIGURE 1).

As seen in FIGURE 1, in the general area of 80 at the rear of the enclosure 12 is located rear bulkhead 60. The rear bulkhead 60 is apertured to accommodate the journaled ends of the two shafts of the pair of spiraled roller strippers 112 and shaft ends of the conveyors 120. Looking now to FIGURE 4 wherein there is seen a bulkhead 60 which forms the rear wall for enclosure 12 and a supporting framework for the ends of the shafts of the spiral rollers and conveyors. Bulkhead 60 is apertured as at 61 to receive the bearings 88, 88' which are suitably mounted in adjustable hanger plates 78 and 78'. The hanger plate 78' carrying the spiral roller 112' is fixed into position at bulkhead 60 by bolts 63, for example. The spiral roller 112 is suitably spring loaded at each extremity thereof so as to enable it to move with respect to the adjacent spiral roller 112'. The upper bearing 88 is suitably attached, as by welding, to the movable hanger plate 78 member which passes through strap 89 where it then joins a threaded rod portion 85 that reciprocates in bushing 86. The threaded rod is provided with fixed washer or stop 91 and spring 90 that in turn urges the plate member towards adjacent roller 112'. The end of the threaded rod carries a nut or adjustable arrangement at 87 which may be adjusted to provide a selected or predetermined tension on the upper extremity of the roller and its corresponding bearing 88. At the opposite extremity of the spiral rollers 112 and 112' is a structural member 116 located in the lower forward end of enclosure 12 near the gate 14. The structural member 116 carries an adjustable plate member 114 that attaches to a bearing 115' to provide a forward mounting means for the spiral roller 112'. The oppositely rotating adjacent spiral roller 112 is received in bearing 115 which is resiliently guided in a spring loaded means essentially as before described in connection with the opposite and before mentioned journaled end of the spiraled roller 112.

The driven end of the spiraled rollers are each suitably connected to universal joints 83 having a shaft 84, 84' therebetween and connected to pulleys 153, 153' by a shaft 92, 92' mounted in bearing 82, 82' received in bulkhead 62. It should be understood that the spiral roller 112 is free to move toward and away from the adjacent and opposite rotating spiraled roller 112' in accordance with the before mentioned spring biased means which resiliently urges the two spiraled rollers toward each other. The lower journaled end of the spring loaded spiraled roller 112, 112' are each arranged within the corresponding bearing members 115, 115' so as to allow for a limited amount of travel longitudinally of spiraled roller 112' to thereby provide for a lost motion coupling or, in other words, for movement of the shaft 84 toward and away from shaft 84' in accordance with the pressure exerted on the spiraled rollers.

The spiraled rollers 112, 112' as seen in FIGURES 3 and 4, are comprised of a journaled shaft having a helically wound protuberance. The rollers are arranged in pairs and rotate in opposite direction with respect to each other so as to move the cotton stalk therebetween in a direction up and away from structural member 116. Since the cotton plant is fed into the rollers at the end adjacent member 116, and since the spiraled rollers are inclined with respect to the horizontal, the cotton stalk will pass between the rollers, and the cotton, along with its bolls, will accordingly be removed from the cotton plant. The tension of the rollers will remain constant in accordance with the pressure applied through spring loaded devices at 70 and 80 to thereby provide the required pressure to strip the bolls from the particular type cotton stalk that is being harvested from the field.

As best seen in FIGURE 3 taken in conjunction with FIGURE 4, the screw conveyers 120 and 120' are operatively arranged below the spiraled rollers 112 and 112' in a manner so as to receive the cotton as it is removed from the plants, and include shafts having the journaled ends thereof mounted in bulkhead 60 and structural member 116 respectively. The screw conveyers consist of shafts having a continuous helical fin or projection thereabout and rotating in a perforated trough or casing 124 in such a way that the fin pushes the material stripped from the cotton plant toward the rear of the stripper. The trough 124 of the conveyer is suitably apertured as diagrammatically illustrated so as to permit a limited amount of cleaning during the transfer of the cotton therethrough.

The above is a detailed description of an individual stripping unit. The four individual stripping units are ganged together by plates 19 which are attached as by welding to the sides of the enclosure plates 12 near the forward end thereof. At the rear thereof the enclosures 12 of the individual stripping unit 16 are each attached to floor support member 17. The floor support member 17 attaches near to the bottom of bulkhead 60 and bulkhead 62. This floor support member 17 also forms a portion of the cross conveyor 180. Cantilever beams 18 extend from the plates 19 to the rear to the supporting mechanism as will be described later. This unitary stripping device is pivotally suspended from a rack 45 that includes member 44 that is arranged to swing about pin member 46 which in turn is attached to main axle 40 by ear 42. The rack 45 further includes a similar arrangement of members 44, 42, and 46 at the opposite side of the axle and includes two spaced apart vertical members 48 rigidly attached thereto and rigidly connected at each end by horizontal member 50. Horizontal member 50 is in turn connected to a jury strut 52 which is connected to a lifting means such as hydraulically actuated lifting cylinder 56 by joint 54. Hydraulic cylinder 56 is carried by the basket support frame 58 and 59. Actuation of the hydraulic cylinder 56 permits the entire stripper 10 to pivot about pivot pins 46 to thereby provide for positioning of the entire cotton stripper device in a vertical direction.

Transverse movement of the stripper 10 with respect to power unit 200 or the rack 45 is provided by four double journaled arms, preferably arranged in pairs, as seen at 20 and 30 in FIGURE 1. The details of the upper journaled arm or coupling joint 20 are best seen in FIGURE 8, wherein there is depicted two bearing members 22 and 23 rigidly interconnected by the journaled ends of reinforced structural member or cantilever arm 26. Bearing member 22 is bolted as at 25 to cantilever beam 18, and bearing member 23 is bolted as at 25 to plate member 24 which is welded, or otherwise rigidly attached, to horizontal member 50. The two upper coupling joints 20 are aligned at spaced points transverse of the cotton stripper 10 with end 22 of the bearing member attached to cantilever beam 18 at either side of the stripper and with bearing member 23 rearwardly attached to support member 50 of the platform to thereby provide for lateral movement of the stripper relative to the platform. Aligned with the coupling joints 20 and at the lower extremity of the platform is a second pair of journaled arms or hanger joints as indicated by numeral 30, the details of which are adequately shown in FIGURE 9.

The hanger joint 30 is provided with a bearing member 22' which is identical to the bearing members 22 and 23 as previously discussed in connection with FIGURE 8. The bearing 22' is attached to floor support 17 upon the stripping unit 10. The second pivotal point 23' of the hanger joint 30 is attached to the member 44 of the rack 45 by a downwardly depending or journaled male member which is received in a bearing member at the forward extremity of member 44 as indicated by numeral 23'. The two lower hanger joints are in spaced alignment with each other and with the upper pair of spaced coupling joints. Each lower hanger joint has its bearing 22' spaced from and aligned with bearing member 22 of the coupling joint 20 immediately above, and the bearing member 23' of the hanger joint is in spaced alignment with the bearing member 23 of the upper coupling joint. The coupling joint and hanger joint cooperate together to provide low friction coupling means by which the stripping machine may be suspended from the power unit in a manner that is best described as floating. Hence, it should now be evident that a small amount of force placed transverse to the stripping machine of the harvester will cause the stripping machine to move transverse with respect to the power unit. The suspension of the stripping unit 10 to the propelling unit 200 is properly characterized as a parallel-motion linkage.

When harvesting small cotton or sparsely planted cotton the force provided by the cotton stalks and exerted against the lifting guide at 132, 139 and the remaining portions of the cotton stripping machine including the gate and roller stripper may be inadequate to maintain the cotton stripper properly aligned with respect to the cotton rows. Numeral 100 indicates a strutted skid that is adapted to ride against the furrows of the cotton rows to provide an additional force that will tend to enhance the alignment of the cotton stripping machine with the cotton rows. The skids engage the cotton rows preferably at about a 30° angle to the horizontal, as illustrated in FIGURE 3, although an angle of 20° to 40° will prove satisfactory. The elongated skids include an opposed pair of skids arranged between the outer two units of the gatherer. As illustrated in FIGURE 3, the skids are attached below the cantilever beam 18 by struts 182 and 186 which suitably attach the skids 184 and 188 to the sides of adjacent enclosure 12 and plate member 19. The skids are centrally located longitudinally of the cotton stripper 10 forward of the center of gravity.

Looking now to FIGURE 5, wherein there is depicted the pulley and belt drive arrangement that powers the entire cotton stripping machine 10, there is seen, operatively mounted on bulkhead 62, four pair of pulleys adapted to drive the eight roller strippers of the four stripping units and a lower four pair of pulleys operatively driving each of the eight conveyer shafts. Numeral 150 indicates a double pulley drive, each pulley of which powers a pair of the four stripping units located in pairs on either side of the unitary machine 10. The double pulley drive is powered by a splined shaft, not shown, which in turn is powered by the power takeoff unit 202 by suitable drive means connected thereto. The double pulley drive 150 cooperates with a flexible belt 151 that operatively engages each of the pulleys of a pair of strippers one one side of the gatherer 10 to thereby drive the pulleys in the proper direction to actuate the stripping machine in the before described manner. Belt drive 151 accordingly operatively engages conveyer pulleys 156 and 156', conveyer pulleys 155 and 155', idler pulleys 154 and and 154', spiraled roller pulleys 153, 153', and spiraled rollers 152 and 152', as illustrated in FIGURE 5. The second pulley of the double pulley drive powers the various pulleys of the two stripping units located oppositely from the before mentioned pulley system and constitutes a mirror image of the first side so far as concerns rotation of the various pulleys as adequately illustrated in FIGURE 5.

Operation

The cotton harvesting machine travels across the cotton field aligned with the parallel cotton rows. The cotton plants of each row aligned with each stripping unit of the cotton stripper 10 are lifted and guided into the gate 14 by the lifter guide through the gate 14, and into the spiraled rollers 112, 112', where all of the fruit is stripped from the entire cotton plant and subsequently falls into the lower conveyers 120, 120', as best seen in FIGURE 3. Conveyers 120 carry the cotton toward the rear of the stripping unit 10 where it then falls into a transverse conveyer 180 located perpendicular to the conveyer 120, 120'. Transverse conveyor 180 extends at the rear of the stripping unit 10 between the bulkheads 60 and 62. It catches the cotton from the conveyors 120 and 120' and moves it to a central position where it is subsequently air conveyed by blower arrangement 206, 204, and 208, into the overhead hopper 210.

As previously mentioned, the pair of lifter guide means 138, 138' of each stripper unit lifts and guides the cotton into and through the gate 14 where it then enters between the spiral rollers 112 and 112'. The lifter guide is provided in pairs forward of the gate 14 of each of the four ganged stripping units and is free to pivot about pin 133 together and independent of the gate 14.

Since the pin 133 provides a common pivot point for both the lifter guide 138 and a leg of the gate 14, the lifter guide accordingly is free to follow the contour of the soil with the lower portion of the shoe 132 riding on the soil with an upstanding contoured portion overlying the shoe portion that is adapted to lift any low hanging portions of the cotton stalk off the ground and subsequently guide the entire cotton plant between the slot formed by the adjacently arranged pair of shoes and between the outer flange member of the fingers 139, through the gate, to the spiral rollers 112 and 112'. The spiral rollers are spring loaded and the pressure or the force therebetween is adjustable at 70 and 80 so as to be adjustably set for harvesting various types of cotton under various conditions to accordingly give the most satisfactory yield. The two rotating spiraled rollers 112 and 112' rotate with their interfaces moving upwards so as to urge the cotton stalk in an upward direction therebetween as it passes therethrough whereupon the spiral protuberance 113 located on each of the roller shafts 112, 112' will forcibly remove the bolls of cotton from the cotton plant as the stalk passes therebetween. After the cotton bolls have been pulled or removed from the cotton stalk, the bolts then fall into lower adjacent conveyors 120, 120' and the stripped cotton stalk is left standing in the field.

The cotton stripper 10 is predominantly supported by the four journaled arms arranged in pairs from the vertically tiltable before mentioned rack 45 with one pair being located at the upper extremity of the platform and attached to a pair of cantilever beams and the lower remaining pair attached to the lower portion of the platform and to the bottom-most transverse structural member of the ganged cotton strippers. These journaled cantilever arms permit low friction transverse movement of the stripping machine or gatherer with respect to the propelling portion of the harvester. When the stripping machine 10 is lifted free of the ground by raising platform 45, which is positioned as desired in accordance with the hydraulic cylinder 56, the entire unit 10 can be easily moved transverse of the propelling unit 200 by application of a very small force thereto. Hence, it is readily apparent that the stripping unit 10 actually floats with respect to propelling unit 200 or the rack 45. Since a small amount of sideways or transverse pressure or force will cause the unit 10 to move with respect to the propelling unit 200, it follows that the pressure exerted by the cotton stalk as the cotton harvester moves through the field will be transmitted to the stripping unit 10 through the lifting guide elements 131, 132, 139, gate 14, and spiraled roller 112. Under normal circumstances and conditions the pressure exerted by the cotton stalk to these before mentioned members will be amply sufficient to keep the stripping unit 10 perfectly aligned with the cotton rows so long as the propelling unit 200 is positioned with respect to the same cotton rows within the range of travel of the floating mechanism 10 as governed by the length of the cantilever arms. Stated differently, the lateral distance that the stripper moves with respect to the propelling unit 200 is governed and provided by the length of the journaled arms that attaches the stripping unit to the propelling unit. The before mentioned pairs of skids 100 supplement the before mentioned force which aligns the cotton stripper with the remainder of the harvester in cases where the machine is used in sparsely planted or small cotton. Since the skids are arranged at 30° to the horizontal and against each adjacent furrow of the rows in the cotton field, the skids will supplement the action of the lifter guide, gate, and spiraled roller, so as to maintain the stripping unit 10 in exact alignment with the rows of cotton.

As the cotton harvester reaches the end of the field, the entire stripping unit 10 may advantageously be lifted about vertical pivotal point 46 by the action of hydraulic cylinder 56 to enable the harvesting machine to turn around so as to harvest the fruit from the next adjacent four rows of the field.

Under some conditions it may be advantageous to further provide the cotton stripper unit 10 with additional support means from the front thereof. There is accordingly located in plate member 19, placed a spaced distance and centrally located from cantilever beams 18, a supporting ear 160 that provides attachment means, such as a chain and turnbuckle arrangement or the like, that will permit a portion of the weight of the stripping machine 10 to be carried by the upper hopper supporting framework of the propelling unit of the cotton harvester.

Having described my invention, what I claim is:

1. A floating mount means for suspending an implement from an agriculture machine comprising: a load transmitting structure having two spaced load bearing points, swivel means rigidly attached to each swivel means to thereby form two spaced second load transmitting means that can swing in an arc in a common plane with respect to each other; one of said second load transmitting means rigidly attached to the implement, the other said second load transmitting means rigidly attached to the machine; whereby: said implement is free to floatingly swing in a limited transverse direction with respect to the machine; a rack; a second floating mount means, said rack having upper and lower vertically spaced members rigidly attached together, said lower spaced member having an attachment point horizontally spaced from and rigidly attached to a pivotal point, said pivotal point including means for pivotally attaching said rack to the machine to vertically pivot said rack, lifting means interconnecting said upper spaced member to the machine to thereby pivot said rack about said pivotal point, said first recited floating mount means interconnecting said upper spaced rack member to the implement, said second floating mount means interconnecting said lower spaced member of the rack to the implement at a point on the implement.

2. The device of claim 1 wherein the first and second floating mount means are vertically aligned, and including third and fourth floating mount means interconnecting the implement and rack and vertically aligned and spaced from said first and second floating mount means; whereby: said rack pivotally adjusts the vertical height of said implement and said floating mount means floatingly positions the implement laterally of said rack a distance determined by the spaced distance between the two said bearing points of said floating mount means.

3. A cotton harvester adapted to move along the rows of cotton plants in a field of cotton to gather cotton from standing cotton plants and including a propelling unit and a cotton gathering unit composed of a gang of individual stripping units mounted for movement thereon, the gathering unit and the propelling unit being arranged in tandem; the improvement comprising:

means, including a rack, interconnecting the propelling unit and said gathering unit to selectively position the gathering unit vertically with respect to the cotton field; said means further including means interconnecting said gathering unit with said rack to provide for low friction movement of said gathering unit laterally of said rack; and guide means associated with said gathering unit to provide a force to move said gathering unit laterally of said rack to thereby align and guide said gathering unit with respect to a row of cotton;

said means interconnecting said gathering unit and said rack includes: a lower and upper rotable bearing member, each of said bearing members including two spaced apart bearing plates having low friction bearings mounted therein, a cantilever arm having journaled ends fitted into and spacing apart said bearings for low friction movement therein; one said bearing plate of one said bearing member being rigidly attached to an upper portion of said cotton stripper with the remaining said bearing plate of one said bearing member being rigidly attached to an upper portion of said rack;

one of said bearing plates of said lower bearing member being rigidly attached to a lower portion of said cotton stripper with the remaining said bearing plate being rigidly attached to a lower portion of said rack;

said journaled end in two of said bearings being arranged in a vertical plane, the journaled end in the other two of said bearings being arranged in a vertical plane; whereby: said cotton stripper is free to floatingly swing laterally with respect to said rack a distance equal to twice the length of said cantilever arm.

4. The device of claim 3 wherein said rack includes a lower horizontal member rigidly atached to and spaced from an upper horizontal member, a pivot connection adapted to be rigidly attached to a lower extremity of the propelling unit, said lower horizontal member pivotally attached to said pivot connection to provide for pivotal movement of said rack in a vertical direction; power means adapted to controllably lift and lower said rack pivotally about said pivot connection, said upper and lower horizontal members comprising said bearing members that are attached to said bearing plates to thereby cooperate with said bearing plates of said upper and lower bearing members to provide a vertical lifting means for the cotton stripper.

5. The device of claim 4 wherein said platform is provided with a second pair of upper and lower coupling hooks that are vertically aligned and spaced apart along said upper and lower horizontal members to thereby provide for floatingly suspending the gatherer from four laterally and vertically spaced floating means.

6. The device of claim 3 wherein the gathering unit is comprised of at least four individual cotton stripping units rigidly ganged together into a unitary gathering machine with each unit aligned with and adapted to remove cotton from a single row of cotton, a light weight cantilever beam formed of metallic plates rigidly attached between adjacent stripping units and spaced apart by two stripping units, with an inclined extended portion of said beam forming a mount means, each stripping unit including said guide means, said cantilever beam forming a portion of the upper said means interconnecting said gathering unit to said upper horizontal member; and a lower structural member arranged transverse to said ganged stripper at a lower rear portion thereof to thereby form a lower attachment joint for said lower coupling hook.

7. The device of claim 6 wherein a supplemental support means is arranged centrally of the stripping units between said cantilever beams, said support means including a supporting ear attached forwardly of the stripping units and adapted to cooperate with an adjacent upper structural member of the propelling unit.

References Cited

UNITED STATES PATENTS

| | | | |
|---|---|---|---|
| 1,513,737 | 11/1924 | Bohman | 56—121.41 |
| 2,133,217 | 10/1938 | Thornton | 56—15 |
| 2,660,849 | 12/1953 | Knowles | 56—33 |
| 2,835,095 | 5/1958 | Self | 56—33 |
| 2,849,850 | 9/1958 | O'Donnell et al. | 56—11 X |
| 2,853,242 | 9/1958 | Wiltsey | 56—33 X |
| 3,171,241 | 3/1965 | Streb | 56—33 |

LUCIE H. LAUDENSLAGER, *Primary Examiner.*

U.S. Cl. X.R.

56—11, 15, 23